(12) United States Patent
Loukos

(10) Patent No.: US 7,725,262 B2
(45) Date of Patent: May 25, 2010

(54) CLIMATIC FORECAST SYSTEM

(75) Inventor: Harilaos Loukos, Paris (FR)

(73) Assignee: Climpact, Paris (FR)

( * ) Notice: Subject to any disclaimer, the term of this patent is extended or adjusted under 35 U.S.C. 154(b) by 0 days.

(21) Appl. No.: 11/659,348

(22) PCT Filed: Aug. 3, 2005

(86) PCT No.: PCT/FR2005/002010

§ 371 (c)(1),
(2), (4) Date: Jan. 7, 2008

(87) PCT Pub. No.: WO2006/024773

PCT Pub. Date: Mar. 9, 2006

(65) Prior Publication Data

US 2008/0167822 A1    Jul. 10, 2008

(30) Foreign Application Priority Data

Aug. 3, 2004    (FR) .................................. 04 08603

(51) Int. Cl.
*G01W 1/00* (2006.01)

(52) U.S. Cl. ........................ 702/3; 73/170.16

(58) Field of Classification Search ................ 702/1–3, 702/179, 189, 181, 182, 187, 188; 703/5, 703/2; 706/15, 21; 73/170.16, 170.17, 170.18, 73/170.21

See application file for complete search history.

(56) References Cited

U.S. PATENT DOCUMENTS

| | | | |
|---|---|---|---|
| 5,461,699 A | | 10/1995 | Arbabi et al. |
| 5,521,813 A | * | 5/1996 | Fox et al. ........................ 705/8 |
| 6,278,799 B1 | * | 8/2001 | Hoffman .................... 382/159 |
| 6,535,817 B1 | * | 3/2003 | Krishnamurti .................. 702/3 |
| 6,584,447 B1 | * | 6/2003 | Fox et al. ...................... 705/10 |
| 3,220,740 A1 | | 11/2003 | Intriligator et al. |
| 7,069,232 B1 | * | 6/2006 | Fox et al. ...................... 705/10 |
| 2003/0220740 A1 | * | 11/2003 | Intriligator et al. ............. 702/3 |

FOREIGN PATENT DOCUMENTS

CA    2 199 588    9/1998

(Continued)

OTHER PUBLICATIONS

Gershunov et al., Predicting and Downscaling ENSO Impacts on Intraseasonal Precipitation Statistics in California: The 1997/98 Event, Jun. 2000, Journal of Hydrometeorology, vol. 1, American Meteorological Society, pp. 201-210.*

(Continued)

*Primary Examiner*—Michael P. Nghiem
*Assistant Examiner*—Toan M Le
(74) *Attorney, Agent, or Firm*—Blank Rome LLP

(57) ABSTRACT

A climatic forecast system for generating an optimized forecast remotely acquires digital data via a digital network, the digital data including observations and at least one model digital forecast; and performs hybrid forecasting, including inputting the observations, the at least one model digital forecast, and first forecast data. The hybrid forecasting is adapted to process the observations, the at least one model digital forecast and the first forecast data, and to apply at least two of a statistical model, a simple general circulation model, and a multi-model synthesis algorithm to the first forecast data to produce at least one hybrid forecast as a probability density.

24 Claims, 1 Drawing Sheet

FOREIGN PATENT DOCUMENTS

| EP | 1 324 253 | | 8/2002 |
|---|---|---|---|
| EP | 1324253 A1 | * | 7/2003 |
| WO | WO 94/16394 | | 7/1994 |
| WO | WO 97/26613 | | 7/1997 |
| WO | WO 9726613 A1 | * | 7/1997 |
| WO | WO 02/21381 | | 3/2002 |

OTHER PUBLICATIONS

Cofino et al., Bayesian Networks for Probabilistic Weather Prediction, 2002, Proceeding of the 15th European Conference on Artificial Intelligence, IOS Press, 695-700 in ECAI 2002.*

Li et al., Application of Tree-Structured Regression for Regional Precipitation Prediction Using General Circulation Model Output, Nov. 2000, Climate Research, vol. 16, pp. 17-30.*

Silverman, B. W., Density Estimation for Statistics and Data Analysis, 1986, Chapman and Hall.*

Ahrens, B. "Rainfall Downscaling in an Alpine Watershed Applying a Multiresolution Approach". Journal of Geophysical Research American Geophys. Union USA, vol. 108, No. D8, Apr. 27, 2003, pp. CIP13-1, XP002320412, ISSN: 0148-0227 (Abstract).

P.A. Michelangeli, et al., "*The Dynamics of Euro-Atlantic Blocking Onsets*," QJR Meteorol. Soc. 1998; pp. 1045-1070.

P.A. Michelangeli, et al., "*Weather Regimes: Recurrence and Quasi Stationarity*," Journal of the Atmospheric Sciences, vol. 52, No. 8, 1995; pp. 1237-1256.

John Marshall, et al., "*Toward a Dynamical Understanding of Planetary-Scale Flow Regimes*," Journal of the Atmospheric Sciences, vol. 50, No. 12 1993; pp. 1792-1818.

Warren B. White, "*Influence of the Antarctic Circumpolar Wave on Austrialian Precipitation from 1958 to 1997*," Journal of Climate, vol. 13, Jul. 1, 2000; pp. 2125-2141.

J.M. Gutierrez, et al., "*Clustering Methods for Statistical Downscaling in Short-Range Weather Forecasts*," Monthly Weather Review vol. 132, Sep. 2004; 2169-2183.

J.M. Gutierrez, et al., "*Analysis and Downscaling Multi-Model Seasonal Forecasts in Peru Using Self-Organizing Maps*," Tellus (2005), 57A; pp. 435-447.

R. Cano, A.S. Cofifio, J.M. Gutierrez and M.A. Rodriguez, "*Self-Organizing Maps for Statistical Downscaling in Short-Term Forecasting*" Iberian Peninsula (submitted: Apr. 2002).

J.D. Marshall and F. Molteni, 1993, "*Towards a Dynamical Understanding of Planetary Scale Flow Regimes*", J. Atmos. Scie, 50, 1792-1818.

BW Silverman, 1986, "*Density Estimation for Statistics and Data Analysis*", Chapman and Hall.

* cited by examiner

CLIMATIC FORECAST SYSTEM

FIELD OF INVENTION

The present invention relates to the field of climatic forecast computer systems using the observations provided by various measuring stations distributed across a geographical territory.

One of the aims of the present invention is to propose a technical solution using digital and communication means that are compatible with light processing for providing climatic forecasts which in prior art required higher power computers with much higher processing times than those which result from use of the invention.

Multimodel forecasting, requiring considerable computing means, has experienced rapid progress in the last few years and has become the most effective means for climatic forecasting. However, if multimodel forecasting is globally the best solution, it may be locally less efficient than statistical forecasting. As the output resolution of current forecast systems remains relatively low, downscaling is still required.

One of the aims of the present invention is to produce forecasts according to a plurality of methods, to weight them in order to globally synthesize the most reliable possible forecasts.

The forecast system according to the present invention aims to combine multimodel forecasting with other forecasting methods such as statistical forecasting, in order to exploit the respective advantages of various forecasting methods, the aim being to obtain the most reliable possible results whilst maintaining reasonable technical means.

The present invention relates more specifically to a climatic forecast system, using at least one computer comprising in particular a processor and a storage unit, means for remotely acquiring digital data via a computer network or a telecommunication network. According to a first aspect, the present invention consists in particular in synthesizing the forecasts issued by operational centres and transposing them on the local scale by adding the information issued by specifically developed statistical models. The principle of statistical models is based on connecting land observation histories provided by national or private weather centres, with large scale data provided by private or public operational centres.

According to another aspect, the present invention also relates to the determination of forecasts by using so-called "simple" models of one particular variable.

Finally, the invention also allows a combination which is not just a simple juxtaposition of the various abovementioned models, called "hybrid models".

BACKGROUND OF THE INVENTION

Prior art already knows, via American patent No. U.S. Pat. No. 6, 535,817 (Florida State Research), a forecast synthesis method using historical and forecast data. More specifically, the invention protected by said American patent relates to a method for generating an accurate climatic forecast model including steps consisting in:
collecting historical forecast information from various models;
accumulating observation data;
comparing the historical forecast data and the observations to determine the historical performance of the various models;
generating a multimodel superensemble of climatic models based upon the performances of each of the models.

Prior art also knows, from American patent U.S. Pat. No. 5,461,699 (IBM), a forecast system including a three-layer (or more generally multilayer) neural network. Said network is applied to climatic data and trained on such data. The first node of the input layer is connected to the statistical forecasts whereas the other nodes are linked to one historical datum from the set of historical data.

Prior art also knows patent application PCT WO 94/16394 (Strategic Weather) which relates to a forecast system and method developed from the impact of the climate on management planning applications. More specifically, said international application relates to a computerised system and method with which weather forecasts are introduced into a predictive model which quantifies historical weather impact relations between datasets, said forecasts being used for predicting the future impact of the climate on management plans. The predictive model can use multiple regression or a neural network. In one application relating to retailing, the computer system and method have a weather impact predictive model based on correlations established between historical weather conditions and point of sale store transactions data. The weather impact model is coupled with weather forecasts to adjust management plans for buying, distributing, financial budgeting, promotional and advertising applications. A graphical user interface provides easy assimilation of the analysis in relation to specific management applications.

Prior art also knows, from patent application PCT WO 97/26613 (Strategic Weather), a system and method for forecasting retail performances according to the meteorology. Said international application therefore relates to a system and method for forecasting future retail performances. The system comprises a storage unit storing a sales history database, and a weather forecast database. An analysis module determines the extent to which the past retail performance of a plurality of products in various point of sale stores was affected by weather conditions, using the sales history database and the weather forecast database. A configuration module, coupled to the analysis module, estimates the expected future retail performance for said products in shops, for a plurality of future time periods, using the weather database and results produced by the analysis module. A graphical user interface, coupled to the analysis module and the configuration module, enables users to view and manipulate results produced by the analysis and configuration modules, and thus to forecast the future retail performance of the products concerned in the point of sale stores considered.

Finally, the Canadian patent application CA 2 199 588 (Hoffman Efrem) is also known which proposes a hierarchical recognition and identification system for data matrix connections.

Prior art also knows, via patent application PCT WO 02/21381 (Planalytics), a system, method and computer program allowing conjunctural forecasts to be obtained in the short term according to the meteorological weather.

Also known in prior art is the American patent U.S. Pat. No. 6,584,447 Planalytics which relates to a system and method for forecasting future retail performances. This is a conventional system comprising a storage device and in particular a database relating to sales data and a database relating to weather history data and a database for forecast data.

Via European patent application EP 1 324 253 (Météo France), a method for providing a weather index is also known. To provide a weather index, said method includes steps consisting in: measuring at least one weather phenomenon with at least one geographical position to obtain at least one weather datum; obtaining at least one so-called human datum linked to a least one economical or demographical size relating at least to one geographical area including the respective position; and calculating an index from said data.

In the field of climatic forecast, the following scientific publications are also known:

R. Cano, A. S. Cofiño, J. M. Gutiérrez and M. A. Rodriguez, *Self-Organizing Maps for Statistical Downscaling in Short-Term Forecasting. A Case Study in the Iberian Peninsula*, Applied Meteorology (submitted), April 2002;

White, W. B., 2000, *Influence of the Antarctic Circumpolar Wave on Australian Precipitation from 1958 to 1997*, J. Climate, 13, 2125-2141;

Marshall J D, and F. Molteni, 1993, *Towards a dynamical understanding of planetary scale flow regimes*, J. Atmos. Scie, 50, 1792-1818;

Michelangeli, P A, R. Vautard and B. Legras, 1995, *Weather Regimes: recurrence and quasi stationarity*, J. Atmos. Sci., 52, 1237-1256;

Michelangeli, P A, and R. Vautard, 1998, *The dynamics of Euro Atlantic blocking onsets*, Quart. J. Roy. Meteor. Soc, 124, 1045-1070;

Silverman, B W, 1986, *Density estimation for statistics and data analysis*, Chapman and Hall.

SUMMARY OF THE INVENTION

One of the main aims of the present invention consists in producing the most reliable possible local forecast, and effectively, i.e. in particular with reduced computing times, and with reasonable technical means.

Another aim of the invention is to succeed in obtaining synergies between various predictive sub-modules, i.e. combining sub-modules by retaining their respective advantages and compensating for their weaknesses, and not producing simple juxtapositions of various already known sub-modules.

If the solutions known by prior art addressed highly specific problems, of extremely restricted scope, the present invention proposes to resolve the delicate problem of forecasting climatic fluctuations in a much more global way.

In relation thereto, the present invention relates, in its more general meaning, to a climatic forecast system, using at least one computer comprising in particular a processor and a storage unit, means for remotely acquiring digital data via a computer network or a telecommunication network, said digital data being observations and single-model or multimodel digital forecasts, said system being characterised in that it further comprises hybrid forecasting means inputting said overall observations and forecasts and outputting at least one hybrid forecast in the form of probability density, said hybrid forecasting means including a combination and not just a simple juxtaposition of at least two models among statistical models, simple general circulation models and multimodel synthesis algorithms.

Preferably, said system further includes:

synthesis means of said overall forecasts outputting at least one multimodel forecast, to which is associated a probability density of at least one environmental variable, said synthesis means including multimodel synthesis algorithms;

final synthesis and benchmarking means, combining, in particular, data issued by the multimodel forecasting module with those of the statistical forecasting module.

Advantageously, said system further includes simple digital means inputting said observations and outputting simple digital forecasts of environmental variables, said simple digital forecasting means including simple general circulation models.

Advantageously, said system further includes statistical forecasting means inputting said observations and outputting at least one statistical forecast of at least one environment variable, said statistical forecasting means including statistical models.

Preferably, said system further includes digital and/or statistical downscaling means.

Preferably, said system further includes, at the benchmark and overall synthesis step, feedback means on said forecasting means.

According to one embodiment, said multimodel synthesis, statistical forecasting, hybrid forecasting, downscaling, benchmarking, or overall synthesis means use Bayesian statistical methods.

Preferably, said forecasting and statistical processing means use statistical methods bringing into play neural networks.

According to one variant, said forecasting and statistical processing means perform non-linear regression for each neural network.

According to another variant, said statistical forecasting means use analogue models.

According to one particular variant, said statistical forecasting means use persistence models.

Advantageously, said system further includes interfacing means with at least one operational forecast centre (regional, national, or international, and public or private) transmitting said overall forecasts (single-model or multimodel).

The present invention also relates to a climatic forecast method for using the system, comprising the following steps:
an observations acquisition step;
a digital forecasts acquisition step;
a hybrid forecasting step.

Preferably, said method further includes:
a simple digital forecasting step;
a statistical forecasting step;
a multimodel forecasting step;
a downscaling step;
a benchmarking and overall synthesis step of said forecasts;
a feedback step during the benchmarking and overall synthesis step.

BRIEF DESCRIPTION OF THE DRAWING

The invention will be better understood with the aid of the description, drafted hereafter purely as an explanation, of one embodiment of the invention, referring to FIG. 1 appended which schematically illustrates the system according to the invention.

DETAILED DESCRIPTION OF THE PREFERRED EMBODIMENT

Figure 1:
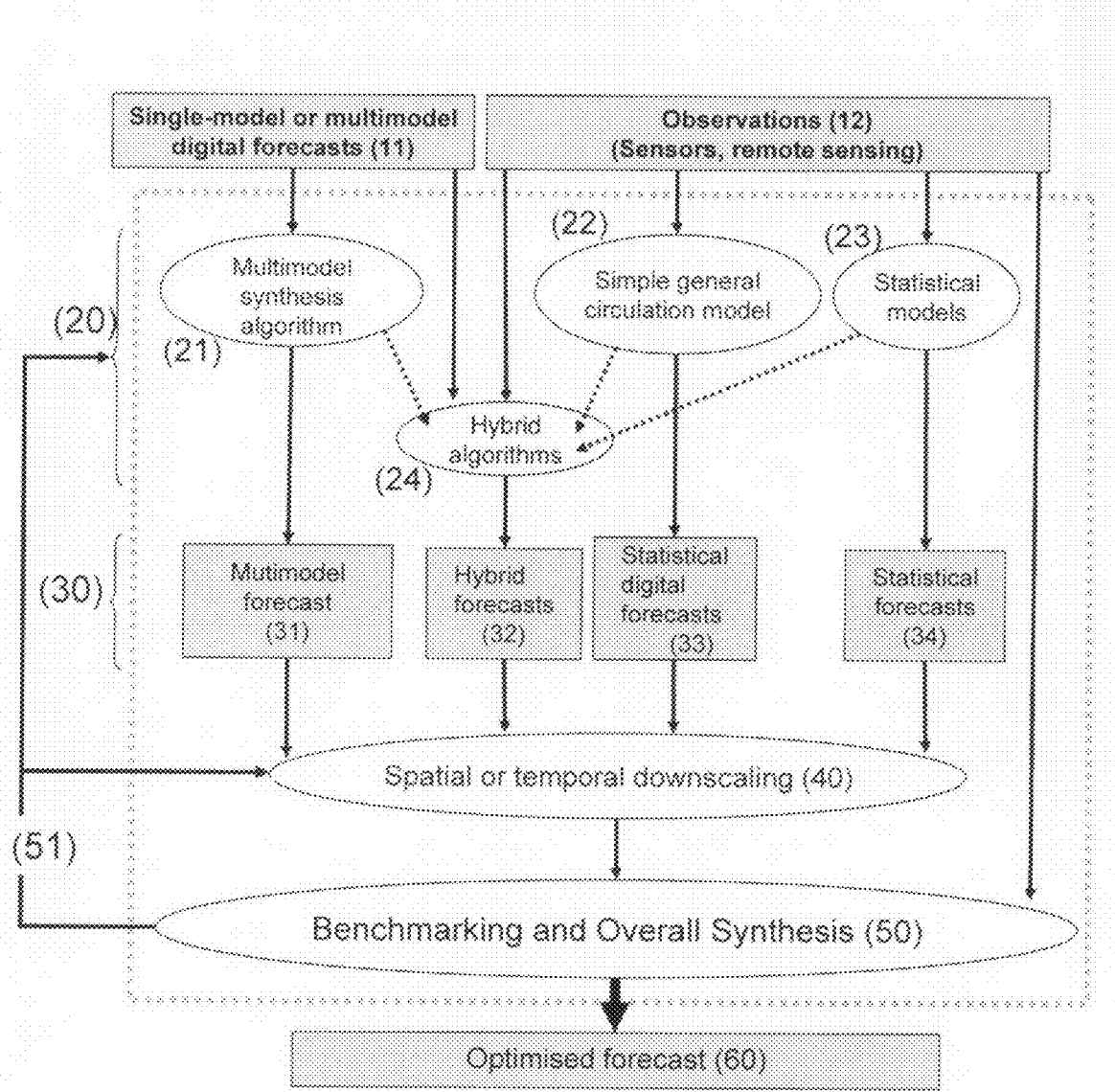

The quality of the forecasts not only depends on the geographical area and the seasons, but also on the models. It is therefore advisable to use the forecasts from various models on the area where they are the best, which involves the construction of a supermodel taking into account source models.

For each model, for example, of 10 day weather type, climatic over a plurality of months type, or climatic change over a century type, the geographical resolution is improved. It is transposed by statistical and digital methods on a scale that may reach a few square kilometres.

The system according to the invention comprises statistical and downscaling means. This consists in identifying on the historical data, large scale structures which favour the occurrence of small scale events that we seek to forecast. In the case where large scale structures are precursors of local events, statistical forecasting, or otherwise statistical downscaling is referred to.

The invention also uses operational forecasting and statistical forecasting benchmark methods. This consists in continuously evaluating:
- the reliability of each of the methods in order to evaluate their respective robustness;
- the concordance of the forecasts in order to globally evaluate the robustness;
- the combination of forecasts in order to provide the optimum forecast.

According to one preferred embodiment, the system according to the invention uses neural networks for statistical analysis in the climatic field. Said neural networks firstly provide a non-linear approach of the analysis and rapid processing of a large data flow.

Finally, one of the aims of the present invention is, with the aid of high resolution forecasts, to propose a management plan suitable for the company, for example, to optimise sales. With the aid of sales histories and the correlation between climate and sales, data synthesis may be carried out to integrate climatic or weather forecasts into the managerial plan.

In the field of climatic forecasting, a "digital model" means a mathematical equations resolution model for a system of physical (but sometimes also chemical and/or biological) laws on the initial conditions and at suitable limits via a digital method which allows integration of the system of equations in time and space.

Referring to FIG. 1, the simple-model or multimodel digital forecasts (11) are overall or deterministic forecasts, issued by global atmospheric circulation models coupled or not coupled to other models (ocean, biosphere, cryosphere, chemical, etc.) a plurality of forecasting types the main ones of which are weather forecasts provided by the ECMWF (European Centre for Medium range Weather Forecasts) or the NCEP (National Center for Environmental Prediction), seasonal forecasts from the ECMWF, NCEP or the MetOffice and climate change simulations.

Single-model or multimodel digital forecasts relate to environmental variables (by way of example: temperature, precipitations, CO2 level, ozone level, etc.) or climatic indexes constructed from said environmental variables. It should be noted that the main climatic indexes are:
- the atmospheric pressure characterised by the SOI (Southern Oscillation Index), the NAO (North Atlantic Oscillation), the PNA (Pacific North America), the PDO (Pacific Decadal Oscillation),
- the sea temperature across specific oceanic regions (Equatorial Pacific in the case of El Nino),
- or even the wind with the position of the ITCZ (Intertropical Convergence Zone).

The present invention is not limited to said different indexes and remains valid for models using a large number of indexes.

Forecasts greatly depend on the observations made (12). Said observations are any type of observations measured by any type of ground or airborne instrument but also computer-simulated observations. Local sensors or remote sensing means are often used. Acquiring said observations with the system according to the present invention is produced via acquisition means such as FTP (File Transfer Protocol) using a computer (IP) or communication network.

Thus, one-off measurements made at a specific geographical point are distinguished. For said measurements, surface sensors such as automatic weather stations, Synop or Metar, are used. Sounding balloons are also used for the air, or buoys for the sea environment.

The second large group of observations relates to synoptic observations via remote sensing on the ground. The equipment used is, non-exhaustively, the LIDAR, the HF Radar and profilers.

As opposed to remote sensing on the ground, airborne remote sensing provides observations concerning the wind, for example, by means of an airborne LIDAR or an SAR (Synthetic Aperture Radar), but also sea surface temperature measurements or plant cover measurements, said measurement being made by satellites.

Observations made are deduced from certain indexes characterising, for example, the atmospheric pressure (SOI index, NAO or PNA oscillations, Branstator-Kushnir wave), the sea temperature (according to the El Nino phenomenon), the wind (position of the ITCZ) and many other indexes.

The third group of observations is that of computer-simulated observations. Indeed, digital models may be used to simulate or estimate after the event (i.e. in the past) the value of environmental variables (for example, temperature, pressure) across areas of the globe devoid of measuring instruments. Therefore, Analyses or Reanalyses are referred to. For example, the NCEP centre or the ECMWF centre provide said type of data (respectively NCEP Reanalysis and ECMWF Reanalysis) on a number of variables and over a plurality of decades.

As illustrated by FIG. 1, all of said observations (12) and said single-model or multimodel digital forecasts (11) provide via the present invention an optimised climatic forecast (60). For this, a plurality of algorithms and models (20) are used on the observations and single-model or multimodel forecasts. Forecasts (30) issued by said algorithms and models are, then, optimised via two successive steps: downscaling (40) and benchmarking (50), a step consisting in evaluating the reliability and robustness of the forecasts.

By using a multimodel synthesis algorithm (21), single-model or multimodel digital forecasts, only, provide a multimodel forecast (31) which is, for example, a probability density of values of one variable, most probably from other statistical moments.

Said algorithm uses a synthesis based on digital forecasts alone which may, as described in the Kernels method (Silverman 1986), be a Probability Density Function (PDF) in one point from individuals of a single-model assembly. Alternatively, said method may be extended to 2D or 3D models, as in the S. Corti method. Preferably, said method is extended to multimodel assemblies.

The processing of observations (12) also provides statistical forecasts (34) as well as simple digital forecasts (33) but also provides, in association with the processing of single-model or multimodel digital forecasts (11), hybrid forecasts (32).

Simple digital forecasts (33) are forecasts of one specific variable, either deterministic, or a probability density function of the variable, and are obtained with the aid of simple general circulation models (22). Said models are particularly well suited to a specific problem and have the advantage of requiring few computing means. They are, usually, specific to a particular region. Numerous simple general circulation models already exist. For example, for forecasting weather regimes for mid-latitudes, a simple atmospheric model, such as one of those which have been developed by Marshall and Molteni, may be used. The Cane-Zebiak model, developed by two scientists with the same name, may be used for forecasting the sea surface temperature in the Equatorial Pacific.

Said simple models may be simplified models of those used for obtaining single-model or multimodel forecasts (11).

Statistical models (23) generate statistical forecasts (34), forecasts based on statistical forecasts determined by the historical analysis of available data obtained via observations. Said models are based on notions such as persistence, auto regression or analogy and produce combinations of the latter. Persistence consists in maintaining anomalies from the previous month or months. Using auto regressive models allows, for example, the future month to be forecast based on the current month and/or past months. Various types of auto regressive models exist, the most known of which are the ARMA (Auto Regressive Moving Average) type auto regressive models and neural auto regressive models which are based on neural networks. Analogue models produce a statistical link between "predictor" variables at month M and a "predicting" variable at month M+X, where X is a whole number. The analogue models are, for example, used for forecasting precipitations in Australia from the surface temperatures of the Austral Ocean during previous months as described in White 2000. Statistical forecasts thus generated provide a probability density of one variable and other statistical moments.

Finally, hybrid models (24) generate hybrid forecasts (32) in the form of value probability density for a variable at a point, from single-model or multimodel digital forecasts (11) and/or observation data (12). Said models are a combination and not a simple juxtaposition of at least two models taken among statistical models (23), simple general circulation models (22) and multimodel synthesis algorithms (21). More specifically, hybrid models combine the methodological approaches and tools according to which the previously mentioned models are constructed. For example, a hybrid model will generate a probability density function from a specific value (for example, the median) issued by a probability density generated from one of the previously mentioned models (for example, multimodel synthesis algorithms) and the geometry of a probability density function issued by one other type of model (for example, a statistical model). The PDF of the hybrid models will therefore be generated from a combination of at least two models and not from the combination of results from at least two or more models. Said example is not limited, diverse combination techniques may be used in hybrid models (as for example, discriminant multivariate analysis or data assimilation techniques) and therefore do not constitute a limit to their definition.

The method according to the present invention produces a spatial as well as temporal downscaling step (40) on the forecasts obtained by the previously described models, i.e. the multimodel (31), hybrid (32), simple digital (33) and statistical (34) models. Prior art already knows methods allowing forecast downscaling to be carried out. The downscaling step allows in particular small scale scenarios to be calculated, i.e. specific to one site, by means of a global climatic model (on a large scale). The forecast obtained by this step is in the form of value probability or value probability density of one variable at a point where the geographical and/or temporal forecast is clearly greater than that of the initial data. Three types of downscaling are distinguished. On the one hand, digital downscaling is based on regional digital models (MM5, HIRLAM, Méso NH), nested regional digital models (MM5) or CFD (Computational Fluid Dynamics) digital models (MésoNH, WRF). On the other hand, statistical downscaling produces a statistical relationship between either one model variable and one local variable, for example, via linear regression by means of one neural network or via a geostatistical interpolation technique (Kriging), or a predictor model variable and a predicting variable via analogue models which classify the structures (pattern) on a large scale and establishes links with local variables (SOM/Kohonen technique). Said structures may be atmospheric structures (pressure, temperature fields) or oceanic structures (surface temperature, sea current fields). Finally, hybrid downscaling is a statistical combination of at least one part of the fields having already undergone digital downscaling, via linear combination or not. A neural network combination technique (SOM Self Organizing Maps techniques), for example, may be used.

Still referring to FIG. 1, the last step of the method according to the invention consists in benchmarking (50) and an overall synthesis of the forecasts generated by the previously mentioned steps. The benchmarking aspect of said step resides in a calculation of the reliability of each forecast, issued or not by the downscaling (40) step, from available historical forecasts and observations (12). It is possible to use probabilistic score (ROC score) or deterministic score methods.

As regards the overall synthesis, it more specifically relates to an analysis and a multi-method forecast synthesis. For example, it may be produced by comparing the probability density functions of forecasts issued by the preceding steps, according to the Kolmogorov Smirnov test, then by compiling probability density functions according to their reliability score. Bayesian statistical methods may also be used in order to perform the synthesis of various PDF.

In order to optimise the forecasts provided by the system according to the present invention, feedback mechanisms (51) are used at the time of the final synthesis. Said feedback takes place on the models and algorithms (20) and/or on the downscaling (40) module. The objective is to select the most relevant forecasts according to one or more predetermined criteria and to optimise the parameters of the various modules (20 and 40) based on the observations (12).

The invention is described in the above-mentioned paragraphs by way of example. It is expected that the person skilled in the art is able to produce various variants of the invention without necessarily deviating from the scope of the patent.

The invention claimed is:

1. A climatic forecast system for generating an optimized forecast, the system comprising:
   a computer including a processor and a storage unit;
   means for remotely acquiring digital data via a digital network, said digital data including observations and at least one model digital forecast; and
   means for hybrid forecasting, including,
      means for inputting said observations, said at least one model digital forecast, and first forecast data,
      means for hybrid forecasting adapted to process said observations, said at least one model digital forecast and said first forecast data, and to apply at least two of a statistical model, a simple general circulation model, and a multi-model synthesis algorithm to said first forecast data to produce at least one hybrid forecast as a probability density, and
      means for outputting said at least one hybrid forecast.

2. The climatic forecast system according to claim 1, wherein said at least one model digital forecast includes at least one of a single-model forecast and a multi-model forecast.

3. The climatic forecast system according to claim 1, wherein the means for forecasting is adapted to apply at least a second model including at least one of the statistical model, the simple general circulation model, and the multi-model synthesis algorithm.

4. The climatic forecast system according to claim 1, further comprising at least one second means for forecasting, the second means for forecasting including at least one of:
  first means for generating at least one multi-model forecast having an associated probability density of at least one environmental variable using at least one multi-model synthesis algorithm;
  second means for generating simple digital forecast of environmental variables from said observations and simple general circulation models; and
  third means for generating at least one statistical forecast of at least one environmental variable from said observations and statistical forecasting models.

5. The climatic forecast system according to claim 4, further comprising means for synthesizing an optimized forecast according to at least one of a hybrid forecasting model, a multi-model forecasting model, a simple digital forecasting model, and a statistical forecasting model.

6. The climatic forecast system according to claim 5, further including means for comparing the optimized forecast to historical data.

7. The climatic forecast system according to claim 5, wherein at least one of the hybrid forecasting model, the multi-model forecasting model, the simple digital forecasting model, and the statistical forecasting model uses a Bayesian statistical method.

8. The climatic forecast system according to claim 1, further comprising means for downscaling.

9. The climatic forecast system according to claim 8, wherein the means for downscaling is adapted to downscale the at least one hybrid forecast using at least one of a digital processing method and a statistical processing method.

10. The climatic forecast system according to claim 9, wherein the statistical processing method includes an analog model.

11. The climatic forecast system according to claim 1, wherein the means for processing includes at least one neural network.

12. The climatic forecast system according to claim 1, further comprising means for interfacing with at least one forecast center to transmit said at least one hybrid forecast.

13. The climatic forecast system according to claim 12, wherein the at least one forecast center includes at least one of a regional, national, international, public, or private center.

14. A climatic forecast method for generating an optimized forecast, the method being implemented on a computer comprising a processor and a storage unit and comprising:
  remotely acquiring digital data in said computer via a digital network, said digital data including observations and at least one model digital forecast; and
  hybrid forecasting in said computer, including,
    inputting said observations, said at least one model digital forecast, and first forecast data,
    processing said observations, said at least one model digital forecast, and said first forecast data,
    applying at least two of a statistical model, a simple general circulation model, and a multi-model synthesis algorithm to said first forecast data to produce at least one hybrid forecast as a probability density, and
    outputting said at least one hybrid forecast.

15. The climatic forecast method according to claim 14, wherein said at least one model digital forecast includes at least one of a single-model forecast and a multi-model forecast.

16. The method according to claim 14, further comprising applying at least a second model including at least one of the statistical model, the simple general circulation model, and the multi-model-synthesis algorithm.

17. The method according to claim 14, further comprising downscaling the at least one hybrid forecast using at least one of a digital processing method and a statistical processing method.

18. The method according to claim 17, wherein the statistical processing method includes an analog model.

19. The method according to claim 14, further comprising synthesizing an optimized forecast according to at least one of a hybrid forecasting model, a multi-model forecasting model, a simple digital forecasting model, and a statistical forecasting model.

20. The method according to claim 19, wherein at least one of the hybrid forecasting model, the multi-model forecasting model, the simple digital forecasting model, and the statistical forecasting model uses a Bayesian statistical method.

21. The method according to claim 19, further comprising comparing said optimized forecast to historical data.

22. The method according to claim 14, wherein the processing includes applying at least one neural network.

23. The method according to claim 14, further comprising interfacing with at least one forecast center to transmit said at least one hybrid forecast.

24. The method according to claim 23, wherein the at least one forecast center includes at least one of a regional, national, international, public, or private center.

* * * * *